United States Patent
Zehavi et al.

[11] Patent Number: 5,892,774
[45] Date of Patent: Apr. 6, 1999

[54] PHASE SHIFT ENCODED SUBCHANNEL

[75] Inventors: Ephraim Zehavi, Haifa, Israel; Edward G. Tiedemann, Jr.; Keith W. Saints, both of San Diego, Calif.

[73] Assignee: Qualcomm Incorporated, San Diego, Calif.

[21] Appl. No.: 766,372

[22] Filed: Dec. 12, 1996

[51] Int. Cl.⁶ .................................................. H04J 1/00
[52] U.S. Cl. ............................................. 370/527; 370/335
[58] Field of Search .................................... 370/320, 335, 370/342, 522, 527; 375/250, 206

[56] References Cited

U.S. PATENT DOCUMENTS

| | | | |
|---|---|---|---|
| 4,261,054 | 4/1981 | Scharla-Nielsen | 455/12 |
| 4,901,307 | 2/1990 | Gilhousen et al. | 370/18 |
| 5,029,331 | 7/1991 | Heichler et al. | 371/43 |
| 5,066,957 | 11/1991 | Mizuno et al. | 342/352 |
| 5,103,459 | 4/1992 | Gilhousen et al. | 375/1 |
| 5,157,672 | 10/1992 | Kondou et al. | 371/43 |
| 5,159,608 | 10/1992 | Falconer et al. | 375/1 |
| 5,204,876 | 4/1993 | Bruckert et al. | 375/1 |
| 5,257,283 | 10/1993 | Gilhousen et al. | 455/38.3 |
| 5,263,050 | 11/1993 | Suttlerlin et al. | 375/1 |
| 5,267,262 | 11/1993 | Wheatley, III | 375/1 |
| 5,283,780 | 2/1994 | Schuchman et al. | 371/43 X |
| 5,297,161 | 3/1994 | Ling | 375/1 |
| 5,299,229 | 3/1994 | Zscheile, Jr. et al. | 375/1 |
| 5,383,219 | 1/1995 | Wheatley, III et al. | 375/1 |
| 5,550,809 | 8/1996 | Bottomley et al. | 370/18 |

OTHER PUBLICATIONS

Ahmad Jalali et al., "Effects of Diversity, Power Control, and Bandwidth on the Capacity of Microcellular CDMA Systems", *IEEE Journal on Selected Areas in Communication*, vol. 12, No. 5, Jun. 1994, pp. 952–961.

*Primary Examiner*—Jeffery A. Hofsass
*Assistant Examiner*—Rafael A. Perez-Pineiro
*Attorney, Agent, or Firm*—Russell B. Miller; Bruce W. Greenhaus

[57] ABSTRACT

A subchannel within a CDMA signal is provided together with a system for receiving and decoding this subchannel. A message is transmitted over the subchannel by applying a sequence of phase rotations to the user data. A single subchannel message can be transmitted during each 1.25 ms segment of user data, resulting in a transmission rates of up to 800 messages per second over the subchannel. Each message corresponds to a fixed sequence of phases, called a phase codeword, used to rotate the user data each time that message is sent. When only two phase codewords are used, the effective data rate for the subchannel is 800 bits per second, but higher data rates may be achieved by increasing the number of codewords used by the subchannel. The subchannel may be decoded by correlating the user data with each of the possible phase codewords.

16 Claims, 7 Drawing Sheets

PHASE SHIFT ENCODED SUBCHANNEL

BACKGROUND OF THE INVENTION

I. Field of the Invention

The present invention relates to communications. More particularly, the present invention relates to a method and apparatus for transmitting data via a phase shift encoded subchannel.

II. Description of the Related Art

FIG. 1 is a highly simplified illustration of a wireless cellular telephone system configured in accordance with the IS-95 over-the-air interface standard. The IS-95 standard and its derivatives IS-95-A etc., referred to herein collectively as the IS-95 standard, have been adopted by the Telecommunications Industry Association (TIA). A system configured substantially in accordance with the IS-95 standard is described in U.S. Pat. No. 5,103,459 entitled "SYSTEM AND METHOD FOR GENERATING SIGNAL WAVEFORMS IN A CDMA CELLULAR TELEPHONE SYSTEM" assigned to the assignee of the present invention and incorporated herein by reference.

In accordance with the IS-95 standard, subscriber units 10 (usually cellular telephones) use radio frequency (RF) electromagnetic signals to establish bi-directional links with one or more base stations 12. Each bi-directional link is comprised of a forward link signal transmitted from the base station 12 to the subscriber unit 10, and a reverse link signal transmitted from the subscriber unit 10 to the base station 12. The Mobile Telephone Switching Office 14 is responsible for connecting all base stations 12 to the Public Switched Telephone Network 16 in the cellular telephone system.

The IS-95 standard provides increased communication capacity over previously existing technologies by utilizing the available RF frequency bandwidth more efficiently. This increased efficiency is achieved by allowing adjacent base stations to transmit and receive signals of the same frequency, and by performing extensive transmit power control on the reverse link to reduce interference. Reverse link transmit power control is the process of maintaining the transmit power of each reverse link signal at the minimum necessary for successful reception by a base station 12.

To perform reverse link transmit power control, IS-95 includes a power control subchannel in the forward link signal so that the base station 12 can send power control commands to the subscriber unit 10. The power control subchannel is formed by puncturing the power control commands into the forward link data once every 1.25 ms, or 800 times each second. A power control command is a bit that indicates whether the transmit power of the reverse link signal should be increased or decreased.

The IS-95 standard also includes various methods for performing forward link power control. Forward link power control is the process of adjusting the transmit power of a traffic channel within the forward link signal as necessary to maintain communication with the corresponding subscriber unit 10.

Each method of performing forward link power control provided by the IS-95 standard includes a method for implementing a power control subchannel in the reverse link signal so that the subscriber unit 10 can transmit power control commands to the base station 12. One method for implementing the reverse link power control subchannel is to transmit the power control command within signaling messages multiplexed into the reverse link data stream.

The maximum rate at which power control commands can be transmitted using signaling messages is once every 20 ms, since IS-95 specifies that only one signaling message can be in each 20 ms frame. In practice, the power control command transmission rate will be considerably less than once every 20 ms because the inclusion of signaling information in a data frame reduces the transmission rate of user data, and therefore signaling messages cannot be transmitted frequently if an acceptable quality of communication is to be provided.

Another method the IS-95 standard provides for implementing the reverse link power control subchannel is essentially described in U.S. Pat. No. 5,383,219 entitled "FAST FORWARD LINK POWER CONTROL IN A CODE DIVISION MULTIPLE ACCESS SYSTEM" assigned to the assignee of the present invention. This second method encodes a power control command in each frame along with the user data, allowing power control information to be transmitted at a sustainable rate of once every 20 ms, with minimal disruption of the user data being transmitted. This second method for performing power control, however, is not available for all data transmission rate sets specified within IS-95.

As will be apparent, both methods of performing forward link power control provided by the IS-95 standard operate at substantially lower rates than reverse link power control, which as noted above operates at rates up to 800 times per second. At the time of the development of IS-95, performing forward link power control at a lower rate than reverse link power control was thought acceptable because the forward link signal is less susceptible to intersignal interference than the reverse link.

The forward link's reduced susceptibility to interference is due to the use of orthogonal channels, which interfere with one another to a substantially reduced degree when compared to non-orthogonal channels. The channels that make up the forward link include a pilot channel, one or more paging channels, one or more synchronization channels, and a set of traffic channels for conducting communication with a set of subscriber units 10.

It has been determined that an IS-95 system would nonetheless benefit from higher speed forward link power control for overcoming the fading conditions experienced in mobile wireless communications environments. Fading is created by various phenomena including multipath interference, and can cause substantial data loss during a communication. Thus, there is a need for a higher speed power control subchannel in the reverse link.

Various methods for performing high speed forward link power control have been suggested, including two power control schemes described in U.S. patent application Ser. No. 08/283,308 entitled "METHOD AND APPARATUS FOR CONTROLLING POWER IN A VARIABLE RATE COMMUNICATION SYSTEM", and U.S. patent application Ser. No. 08/559,386 entitled "METHOD AND APPARATUS FOR PERFORMING FAST FORWARD POWER CONTROL IN A MOBILE COMMUNICATION SYSTEM," both assigned to the assignee of the present invention.

Both of these methods for performing high speed forward link power control suggest puncturing the reverse link signal to insert power control commands. It has since been determined, however, that the puncturing the reverse link signal degrades performance, making the use of such puncturing to provide a power control subchannel undesirable in many instances.

Thus, in order to reduce data loss caused by fading on the forward link, there is a need to provide a non-disruptive, high speed, power control subchannel for performing fast forward link power control. Thus, the present invention is directed to providing an IS-95 compatible power control subchannel in a reverse link signal that does not interfere with the transmission of user data.

SUMMARY OF THE INVENTION

The present invention is a novel and improved method and apparatus for establishing a subchannel within a CDMA signal, together with a system for receiving and decoding this subchannel. In accordance with one embodiment of invention a message may be transmitted over the subchannel by applying a sequence of phase rotations to the user data. In an exemplary embodiment of the invention described herein, a single subchannel message is transmitted during 1.25 ms segments of user data, resulting in a transmission rates of up to 800 messages per second over the subchannel. Each message corresponds to a fixed sequence of phases, called a phase codeword, used to rotate the user data each time that message is sent. When only two phase codewords are used, the effective data rate for the subchannel is 800 bits per second, but higher data rates may be achieved by increasing the number of codewords used by the subchannel. The exemplary embodiment of the invention also includes methods for demodulating and decoding the messages sent over this subchannel in which subchannel data is extracted by correlating the user data with each of the possible phase codewords.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A novel and improved method and apparatus for establishing a subchannel within a CDMA signal is described. In the following description, various signal processing systems and the arrangements thereof are described in detail. It will be apparent to one skilled in the art that a variety of well known methods and apparatus for implementing such signal processing systems may be used including the use of digital signal processors and digital microprocessors controlled by software, or custom designed integrated circuits, with the latter being used in the preferred embodiment. In other instances throughout the application, various well known systems are described in block form. This is done in order to avoid unnecessarily obscuring the disclosure of the present invention.

Where multiple instances of a particular system are shown, a single instance of that system may generally be substituted, with the use of that system being time shared between the functions performed by the multiple systems. In general, the bits, data, symbols and signals referred to throughout the application constitute electronic voltage, charge, or electromagnetic wave dependent representations, or a combination thereof, of various types of information including audio information generated via the sampling of physical phenomena such as sound waves, voltages generated for the purpose of controlling other electronic systems, or human and computer generated digital data. Also, systems other than land based wireless cellular telecommunication systems can benefit from the use of the present invention, including satellite based wireless telecommunication systems, point to point wireless systems, or wire based systems in which modulated sinusoids are used to transmit data including coaxial cable based communication systems.

While the invention is set forth in the context of a system that processes a signal in accordance with the reverse link portion of the IS-95 standard, and is particularly suited for the use with such processing, the invention may be utilized in the context of signals that are not generated in accordance with the IS-95 standard, including, but not limited to, signals generated in accordance with CDMA techniques over which BPSK data is transmitted at one or more duty cycles. Furthermore, while power control data is transmitted via the subchannel described below, use of the subchannel for transmission of other types of data is also consistent with the use of the invention.

Figure 1:
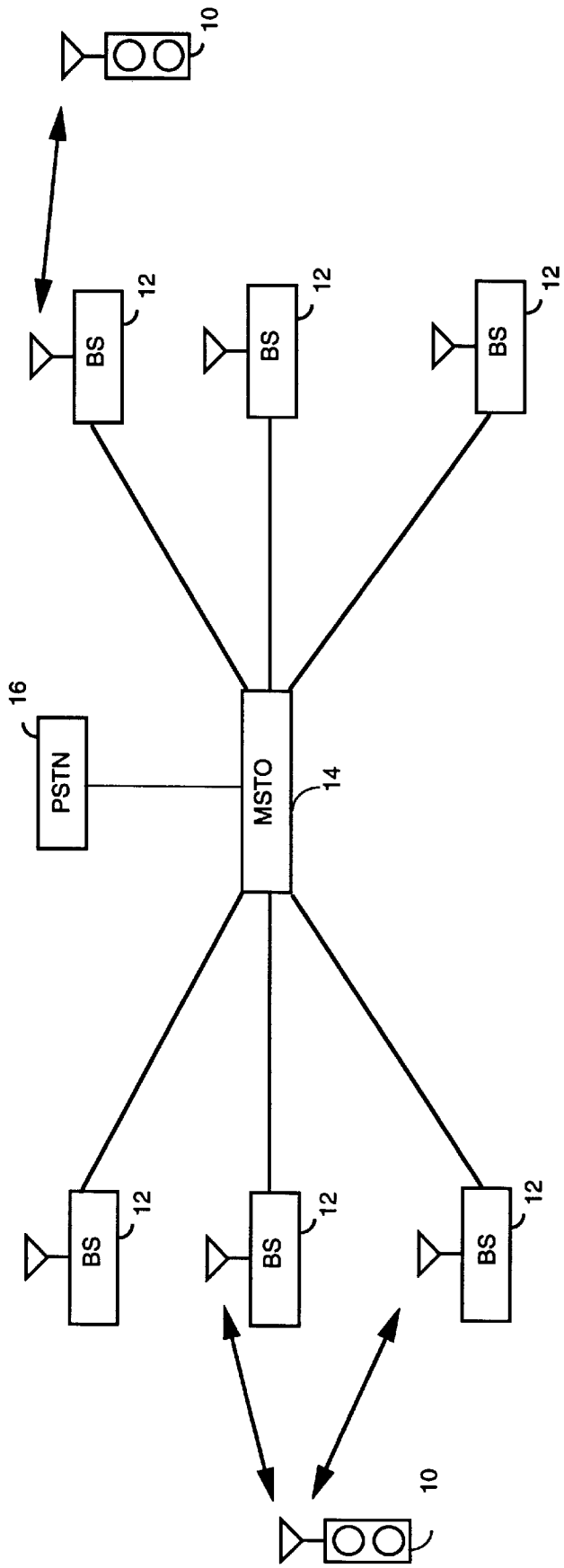
FIG. 1 is a block diagram of a cellular telephone system.
Figure 2:
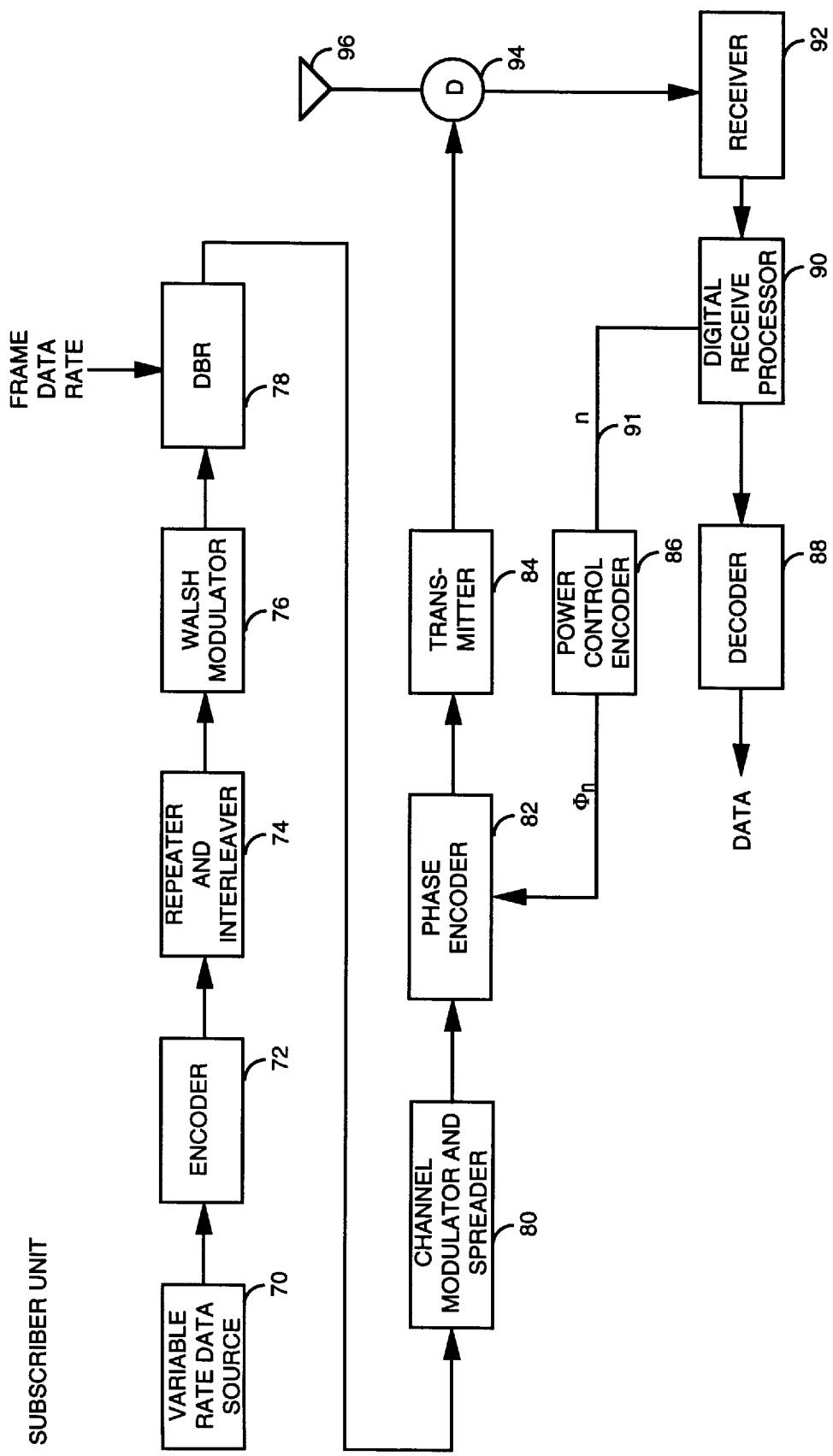
FIG. 2 is a block diagram of a subscriber unit when configured in accordance with an exemplary embodiment of the invention.

FIG. 2 is a block diagram of a subscriber unit 10 when configured in accordance with one embodiment of the invention. Transmit processing begins with variable rate data source 70 which generates variable rate data formatted in 20 ms frames. Typically, the variable rate data is vocoded audio information such as speech. Encoder 72 performs convolutional encoding of the variable rate data, generating frames of encoded data. Repeater and interleaver 74 performs data repeating for the lower rate frames sufficient to generate a maximum rate frame, and then interleaves the frames of repeated data.

Walsh modulator 76 generates a sixty-four bit Walsh symbol for each six bits of interleaved data received from repeater and interleaver 74. Data burst randomizer (DBR) 78 performs pseudorandom gating on the Walsh symbols based on the frame rate of the frame being processed to remove the redundant data introduced by interleaver 74. The gating is performed based on the frame data rate in blocks of six Walsh symbols, called "power control groups." The power control groups have a duration of 1.25 ms (milliseconds), causing each frame to be comprised of sixteen power control groups.

For full rate frames, all sixteen power control groups are transmitted, and for half rate frames, eight power control groups are transmitted. Similarly, for quarter rate frames, four power control groups are transmitted, and for eighth rate frame two power control groups are transmitted. The power control groups are selected such that the set of power control groups transmitted for a lower rate frame are a subset of the set of power control groups transmitted for a higher rate frame. The gating effectively reduces the transmission duty cycle of the frame, thereby reducing the transmit power used during the transmission of the frame.

Channel modulator and spreader 80 modulates the gated data from DBR 78 using a channel code and a set of spreading codes. Phase encoder 82 further modulates the data stream with a sequence of phase rotations used to indicate a message to be transmitted over the subchannel provided by this invention. Transmitter 84 receives the phase rotated data and generates radio frequency signals that are received by diplexer 94 and transmitted from antenna system 96.

While this exemplary embodiment shows phase encoder 82 placed between channel modulator and spreader 80 and transmitter 84, those skilled in the art will recognize that placement at other points during the processing of the reverse link signal is possible, including, but not limited to, placement before channel modulator and spreader 80 or before DBR 78.

The antenna system 96 of subscriber unit 10 receives forward link signals from one or more base stations 12. These forward link signals are passed through diplexer 94 to receiver 92, which downconverts and digitizes the forward link signals. Digital receive processor 90 demodulates the digitized signals and provides soft decision user data to decoder 88. Decoder 88 produces hard decision data by decoding the soft decision user data.

Digital receive processor 90 also generates power control commands n based on the strength or accuracy with which the forward link signal is being received. One method for determining the strength or accuracy at which the forward link signal is being received is described in copending U.S. patent application entitled "METHOD AND APPARATUS FOR ESTIMATION OF RECEIVED QUALITY FOR FORWARD POWER CONTROL," (no serial number assigned, applicants' file number PA303) assigned to the assignee of the present invention and incorporated herein by reference. Other methods for determining the strength or accuracy at which the forward link signal is being received are well known in the art.

Digital receive processor 90 generates a new power control command n once in every 1.25 ms power control group. Each power control command n is represented as an integer n=1, 2, . . . , N, taken from a set of N possible commands, and represents a particular message to be transmitted to each of the base stations 12 which are sending data to subscriber unit 10 on the forward link. In one embodiment of this invention, the value of N is 2, so that only two commands are used: n=1 is an "up" command, indicating that each base station should increase its transmit power by some fixed amount, and n=2 is a "down" command, indicating that each base station should decrease its transmit power by some fixed amount. In another embodiment of this invention, N=4 distinct power control commands are defined, where the commands n=1, 2 correspond to "up" commands with distinct amplitudes, and the commands n=3, 4 correspond to "down" commands with distinct amplitudes. In yet another embodiment, N=8 distinct power control commands are defined, and each command is used to indicate a distinct power level corresponding to the received power on the forward link. Each base station can then use this measurement to calculate an adjustment to the forward link transmit power.

Power control encoder 86 uses the value of the power control command n to select a vector $\Phi_n$ comprised of six phases $$\Phi_n = (\Phi_n[1], \Phi_n[2], \Phi_n[3], \Phi_n[4], \Phi_n[5], \Phi_n[6]). \quad (1)$$

The vector $\Phi_n$ is referred to as a phase codeword, and each individual phase $\Phi_n[k]$, k=1, . . . , 6, is expressed as an angle between 0° and 360°. Each power control command n is mapped to the same codeword $\Phi_n$, and thus in the preferred embodiment of this invention, power control encoder 86 keeps a list of all N codewords $\Phi_1, \Phi_2, \ldots, \Phi_N$, stored in memory, and once in each 1.25 ms power control group selects the particular codeword indicated by power control command n. The individual phases $\Phi_n[k]$, k=1, . . . , 6, are presented to phase encoder 82 in sequence, with each phase having a duration of one-sixth of the 1.25 ms power control group. The list of codewords which power control encoder 86 transmits over the phase-encoded subchannel constitutes an error-correcting code, and principles of coding theory can be used to choose an appropriate code for a specific application. Below, exemplary codes are specified which can be used in accordance with this invention.

Figure 3:
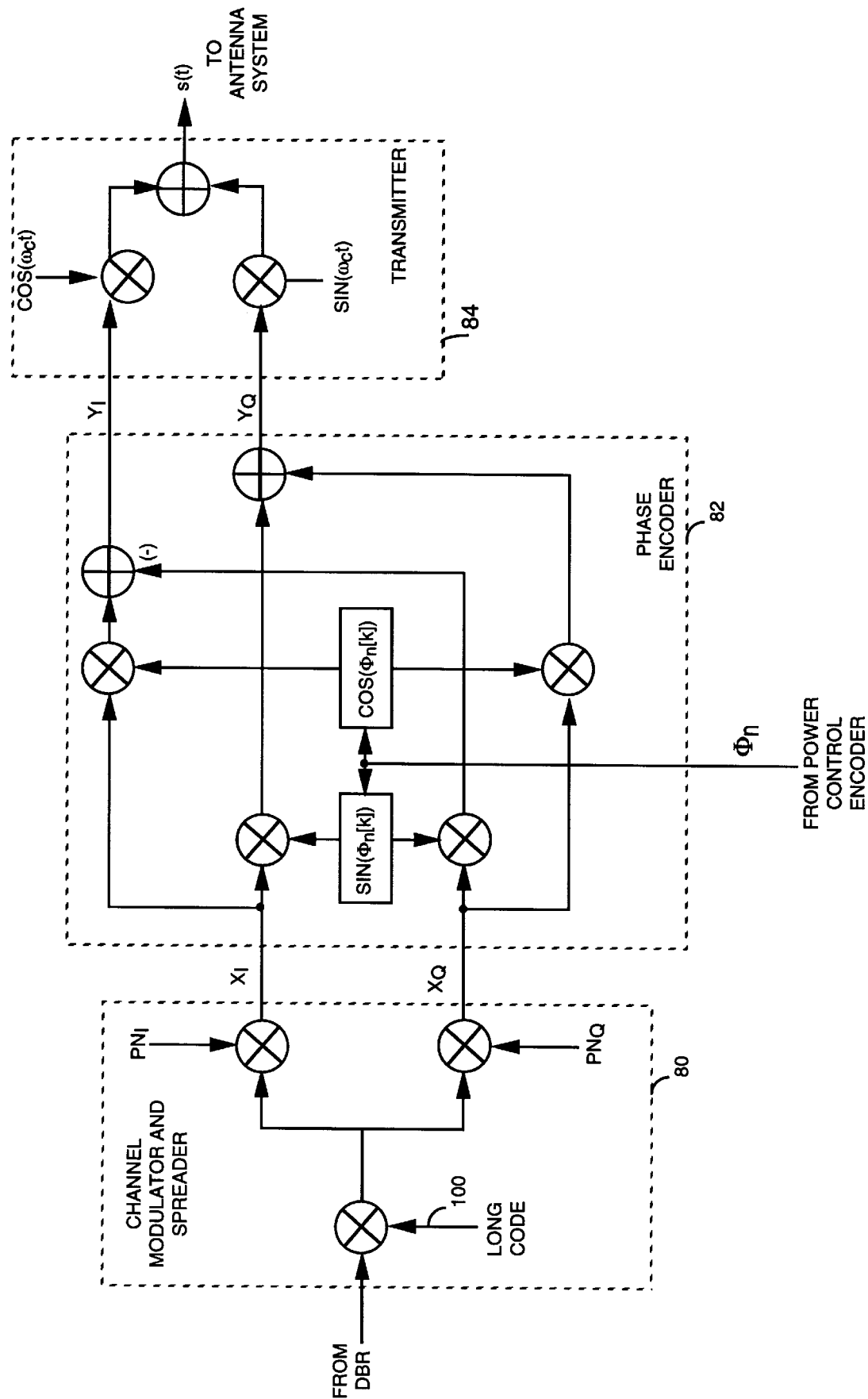
FIG. 3 is a block diagram of a portion of subscriber unit when configured in accordance with an exemplary embodiment of the invention.

FIG. 3 is a block diagram of channel modulator and spreader 80, phase encoder 82, and transmitter 84 of FIG. 2 when configured in accordance with one embodiment of the invention. Gated data from DBR 78 (FIG. 2) is first modulated within channel modulator and spreader 80 using long code 100 at a rate of four long code chips for each Walsh symbol chip. The long code modulated data is further modulated with in-phase spreading code $PN_I$ and quadrature-phase spreading code $PN_Q$, to produce signals $X_I$ and $X_Q$.

Phase encoder 82 rotates the $(X_I, X_Q)$ pair by the angle $\Phi_n[k]$, to produce the signal $(Y_I, Y_Q)$ at its output. The rotation is given by the formula $$(Y_I + jY_Q) = e^{j\Phi_n[k]}(X_I + jX_Q), \quad (2)$$

or equivalently, $$Y_I = X_I \cos \Phi_n[k] - X_Q \sin \Phi_n[k], \quad (3)$$

$$Y_Q = X_I \sin \Phi_n[k] + X_Q \cos \Phi_n[k].$$

The block diagram of phase encoder 82 shown in FIG. 3 shows how this calculation is implemented in the preferred embodiment of this invention. Transmitter 84 modulates the $Y_I$ data by an in-phase carrier sinusoid and the $Y_Q$ data by a quadrature-phase carrier sinusoid, and sums the results yielding signal s(t). Signal s(t) is then provided to antenna system 96 via diplexer 94 (FIG. 2) for transmission to the base station 12.

Figure 4:
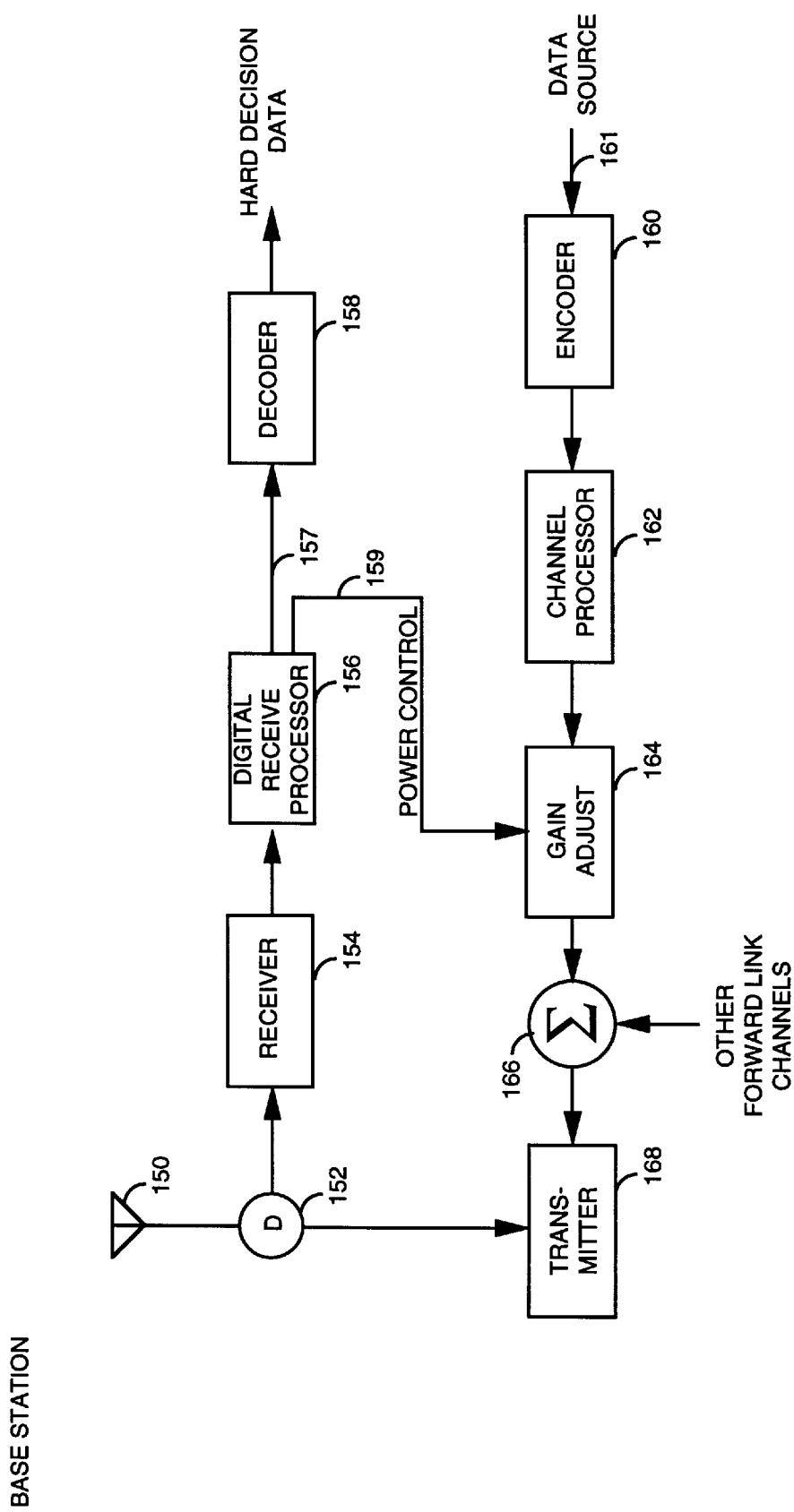
FIG. 4 is a block diagram of a base station when configured in accordance with an exemplary embodiment of the invention.

FIG. 4 is a block diagram of a base station 12 configured in accordance with one embodiment of the invention. Receiver 154 downconverts and digitizes reverse link signals from subscriber units 10 received via antenna system 150 and diplexer 152. Digital receiver processor 156 demodulates the digitized signals yielding soft decision data 157 and power control command 159. Decoder 158 generates hard decision data based on soft decision data 157.

Encoder 160 generates encoded data from data source 161 which is modulated and spread by channel processor 162. Gain adjust 164 then adjusts the gain of the modulated data from channel processor 162 based on power control command 159. Summer 166 sums the gain adjusted data with the data from other forward link channels including other traffic channels as well as pilot and control channels, and the summed data is provided to transmitter 168. Transmitter 168 upconverts the summed data which is transmitted via antenna system 150 by way of diplexer 152.

Figure 5:
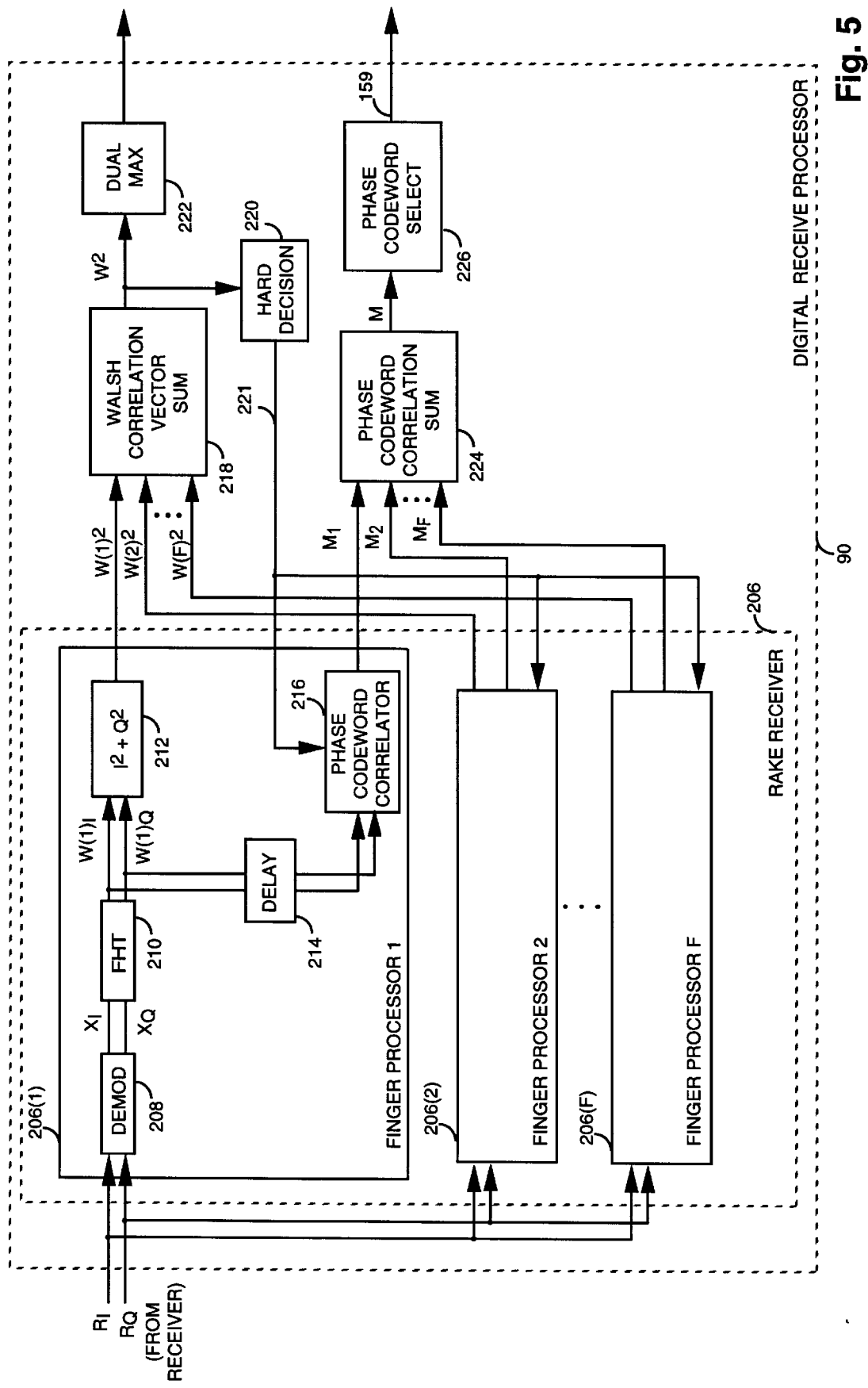
FIG. 5 is a block diagram of a base station digital receive processor when configured in accordance with an exemplary embodiment of the invention.

FIG. 5 is a block diagram of an implementation of digital receive processor 90 (156 as shown in FIG. 4) configured in accordance with one embodiment of the invention. In the preferred embodiment of this invention, receive samples $R_I$ and $R_Q$ (described below) from RF receiver 154 (FIG. 4) are processed by a RAKE receiver 206 which consists of a bank of finger processors 206(1)–(F). Each finger processor 206 processes one instance of the reverse link signal received, with each instance of the reverse link signal being generated by multipath phenomenon such as reflection. However, it should be clear to those skilled in the art that this invention can also be used in a receiver with a single (F=1) finger.

Within finger processor 206(1), shown in greater detail, the receive samples $R_I$ and $R_Q$ are demodulated and despread by demodulator 208. Fast Hadamard Transform circuit 210 performs a Walsh matrix correlation on the demodulated data from demodulator 208 generating Walsh symbol correlation vectors $W(1)_I$ and $W(1)_Q$. For example, $W(1)_I$ is a vector of length 64 in which the entries $W(1)_I[k]$, $k=0, \ldots, 63$, give the correlation of the 64 samples of the signal $R_I$ with Walsh symbol k. Squaring circuit 212 produces a single vector $W(1)^2$ according to the formula $$W(1)^2[k]=(W(1)_I[k])^2+(W(1)_Q[k])^2 \qquad (4)$$

using Walsh symbol correlation vectors $W(1)_I$ and $W(1)_Q$. Walsh correlation vector sum 218 combines the Walsh correlation energy vectors $W(1)^2, W(2)^2, \ldots, W(F)^2$ from each of the finger processors 206(1)–(F), yielding combined Walsh correlation energy vector $W^2$.

Dual max 222 generates binary soft decision data using combined Walsh correlation energy vector $W^2$, and hard decision 220 generates a hard index 221 using combined Walsh correlation energy vector $W^2$. Hard index 221 is a six bit value indicating the Walsh symbol most likely to have been transmitted which, in the preferred embodiment of the invention, corresponds to the greatest Walsh correlation energy value within combined Walsh correlation energy vector $W^2$.

Phase codeword correlator 216 receives Walsh symbol correlation vectors $W(1)_I$ and $W(1)_Q$ after being delayed by delay 214, and generates a vector $$M_1=(M_1[1], M_1[2], \ldots, M_1[N]), \qquad (5)$$

of per-finger phase codeword correlation metrics using hard index 221. Each phase codeword correlation metric $M_1[n]$ is a measurement of the relative likelihood of phase codeword n, given the received data on finger 1, under the hypothesis that the value of the Walsh symbol actually sent corresponds to hard index 221. The actual computation of the phase codeword correlation metrics $M_1[n]$ is shown in detail in FIG. 7 and is discussed below.

Phase codeword correlation sum 224 receives phase correlation vectors $M_1$ through $M_F$ from finger processors 206(1)–(F), and produces a vector M of phase codeword correlation metrics by summing the per-finger metrics of each active finger. Phase codeword select 226 selects the index n* for which the phase codeword correlation metric $M[n^*]$ is maximal. The index n* is used to generate the corresponding power control command 159 which is applied to gain adjust 164 of FIG. 4.

In one embodiment of the invention, phase codeword select 226 indicates that no power control command has been transmitted when no phase codeword correlation metric M[n] is received above a predetermined threshold. This compensates for gated power control groups in lower rate frames during which no power control command can be transmitted.

In still another embodiment of the invention, phase codeword select 226 always uses the phase rate correlation values of the lowest frame rate power control groups, i.e. the eighth rate frame, to generate a power control command, while using the phase rate correlation metrics of the higher rate power control groups only when received above a predetermined threshold. This ensures that at least two power control adjustments are performed each frame regardless of the threshold at which power control groups are received, while also compensating for gated power control groups. The two power control groups from the lowest rate frame are used because, no matter what the frame rate, a power control command will have been transmitted during these power control groups.

Figure 6:
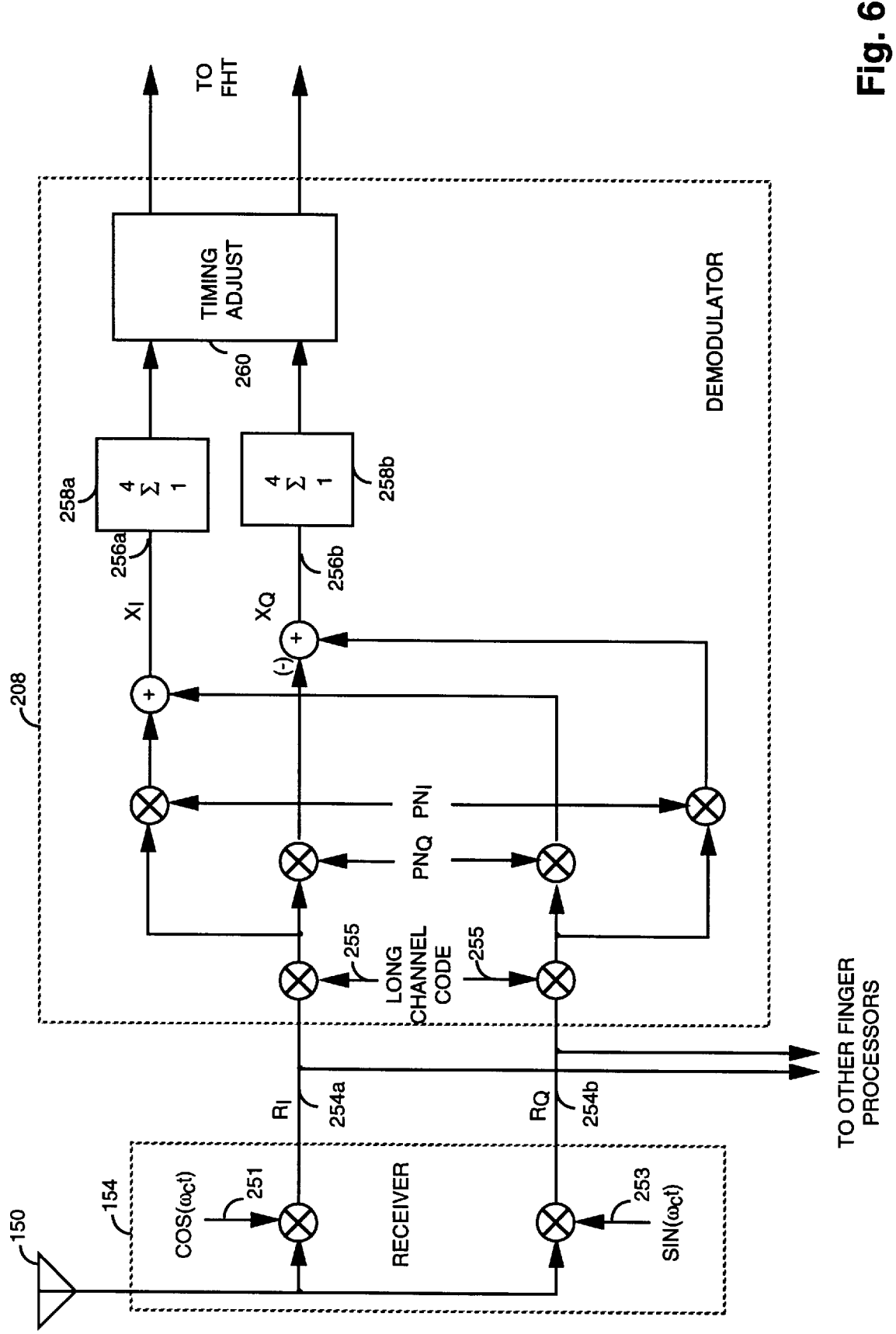
FIG. 6 is a block diagram of a receiver and demodulator when configured in accordance with an exemplary embodiment of the invention.

FIG. 6 is a block diagram of receiver 154 and antenna system 150 (FIG. 4) along with demodulator 208 (FIG. 5) when configured in accordance with one embodiment of the invention. Receiver 154 downconverts reverse link signals received from antenna system 150 with in-phase sinusoid 251 and quadrature-phase sinusoid 253 producing in-phase receive samples $R_I$ 254a and quadrature-phase receive samples $R_Q$ 254b. Both in-phase receive samples $R_I$ and quadrature phase receive samples $R_Q$ are applied to demodulator 208 (FIG. 5) as well as to other finger processors 206(2)–(F), also of FIG. 5, but not shown.

Within demodulator 208, in-phase and quadrature-phase receive samples $R_I$ and $R_Q$ are both demodulated using long channel code 255. Both the in-phase and quadrature-phase long code demodulated data are further demodulated using spreading codes $PN_I$ and $PN_Q$. The in-phase $PN_I$ code demodulated data is then summed with the quadrature-phase $PN_Q$ code demodulated data yielding $X_I$ data 256a, and the in-phase $PN_Q$ demodulated data is subtracted from the quadrature-phase $PN_I$ demodulated data yielding $X_Q$ data 256b. The $X_I$ and $X_Q$ data are summed over four demodulation symbols by summers 258a and 258b, and then passed to timing adjust 260 which delays the data to account for the differing delays incurred by the multipath signal being processed by finger processors 206(1)–(F).

Figure 7:
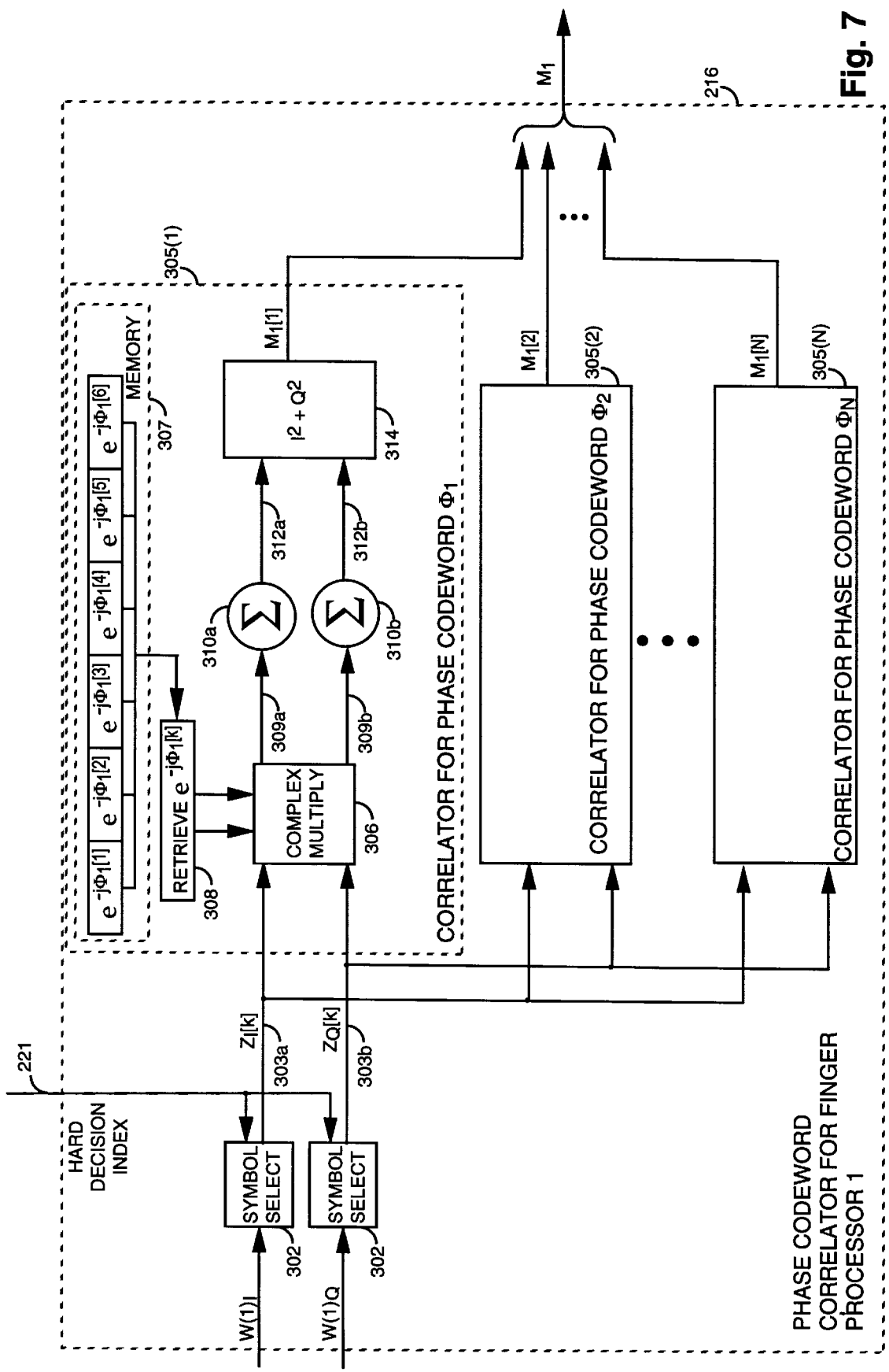
FIG. 7 is a block diagram of a phase rotation correlator when configured in accordance with an exemplary embodiment of the invention.

FIG. 7 is a block diagram of phase codeword correlator 216 (FIG. 5) configured in accordance with one embodiment of the invention. Symbol selectors 302 receive Walsh symbol correlation vectors $W(1)_I$ and $W(1)_Q$ and select correlation values, denoted by $Z_I$ and $Z_Q$, corresponding to hard index 221. New values of $Z_I$ and $Z_Q$ are generated with each received Walsh symbol, and therefore six values of $Z_I$ and $Z_Q$, are generated in the duration of a single power control group. These six values may be denoted by $Z_I[k]$ 303a and $Z_Q[k]$ 303b, where the index k ranges from 1 to 6 to indicate the position of the Walsh symbol within the power control group. This same sequence of values $Z_I[k]$ and $Z_Q[k]$ is presented to each of a bank of correlators 305(1)–305(N).

Each of the phase codeword correlators 305(1)–305(N) contains a memory 307 in which a single phase codeword is stored and is designed to compute a correlation of the sequence of values $Z_I[k]$ and $Z_Q[k]$ with that particular codeword. Phase codeword correlator 305(1) computes the correlation with codeword $\Phi_1$:

$$M_1[1] = \left| \sum_{k=1}^{6} (Z_I[k]+jZ_Q[k])e^{-j\Phi_1[k]} \right|^2. \qquad (6)$$

Memory 307 contains the value of codeword $\Phi_1$, stored in the format $(\cos \Phi_1[k], -\sin \Phi_1[k])$ for $k=1, \ldots, 6$. Each of these data pairs is to be interpreted as the complex number $e^{-j\Phi_1[k]}=\cos \Phi_1[k]-j \sin \Phi_1[k]$. Memory controller 308 retrieves the appropriate data pair $(\cos \Phi_1[k], -\sin \Phi_1[k])$ from memory 307 to coincide with the arrival of the corresponding pair $(Z_I[k], Z_Q[k])$ of values into complex multiplication circuit 306. Alternative methods and apparatus for generating the codeword are contemplated, including providing a formula for generating the codeword during each power control group processed. For example, one could store only the set of phases associated with the codeword, and calculate the cosine and sine values based on the set of stored phases. Similarly, in the constant phase differential example discussed below, one could store only the phase rotation rate, and calculate the set of phases associated with the codeword using equation (7), also described below.

Complex multiplication circuit 306 multiplies the two complex numbers at its inputs, producing a complex number at its output, represented by signals 309a and 309b for its real and imaginary parts. Accumulators 310a and 310b sum signals 309a and 309b over the duration of a power control group, producing signals 312a and 312b. Squaring circuit 314 waits until the end of the power control group and computes the sum of the squares of signals 312a and 312b, which is the phase codeword correlation metric $M_1[1]$.

Each of the other phase codeword correlators 305(2)–305(N) performs similar processing using a different codeword, and thus a complete vector of phase codeword correlation metrics $M_1=(M_1[1], M_1[2], \ldots, M_1[N])$ is generated. As described above, phase correlation vector $M_1$, along with phase correlation vectors $M_2, \ldots, M_F$ from other fingers, is next presented to phase codeword correlation sum 224 in FIG. 5.

By defining a set of phase codewords $\Phi_1, \ldots, \Phi_N$, referred to as a phase code, and then selecting one of these phase rotation rates based on a power control command, power control commands containing various amounts of information can be transmitted up to once every 1.25 ms in an IS-95 reverse link signal.

In a relatively simple embodiment of the invention, a set of N=2 power control commands are defined for transmitting a binary power control command in each power control group. Table I lists the codewords used in an exemplary binary phase code. In this binary phase code, the Walsh symbols will be transmitted with either constant or alternating phase.

TABLE I

Binary Phase Code.

| Power Control Command (n) | Phase Symbol $\Phi_n[1]$ | Phase Symbol $\Phi_n[2]$ | Phase Symbol $\Phi_n[3]$ | Phase Symbol $\Phi_n[4]$ | Phase Symbol $\Phi_n[5]$ | Phase Symbol $\Phi_n[6]$ |
| --- | --- | --- | --- | --- | --- | --- |
| 1 | 0° | 0° | 0° | 0° | 0° | 0° |
| 2 | 0° | 180° | 0° | 180° | 0° | 180° |

In another embodiment of the invention, a set of N=8 power control commands are defined. Table II illustrates an 8-ary phase code which would be suitable for transmission of these power control commands over the phase-encoded subchannel.

TABLE II 8-ary Phase Code.

| Power Control Command (n) | Phase Symbol $\Phi_n[1]$ | Phase Symbol $\Phi_n[2]$ | Phase Symbol $\Phi_n[3]$ | Phase Symbol $\Phi_n[4]$ | Phase Symbol $\Phi_n[5]$ | Phase Symbol $\Phi_n[6]$ |
| --- | --- | --- | --- | --- | --- | --- |
| 1 | 0° | 0° | 0° | 0° | 0° | 0° |
| 2 | 0° | 45° | 90° | 135° | 180° | 225° |
| 3 | 0° | 90° | 180° | 270° | 0° | 90° |

TABLE II-continued 8-ary Phase Code.

| Power Control Command (n) | Phase Symbol $\Phi_n[1]$ | Phase Symbol $\Phi_n[2]$ | Phase Symbol $\Phi_n[3]$ | Phase Symbol $\Phi_n[4]$ | Phase Symbol $\Phi_n[5]$ | Phase Symbol $\Phi_n[6]$ |
| --- | --- | --- | --- | --- | --- | --- |
| 4 | 0° | 135° | 270° | 45° | 180° | 315° |
| 5 | 0° | 180° | 0° | 180° | 0° | 180° |
| 6 | 0° | 225° | 90° | 315° | 180° | 45° |
| 7 | 0° | 270° | 180° | 90° | 0° | 270° |
| 8 | 0° | 315° | 270° | 225° | 180° | 135° |

The phase codes listed in Tables I and II can be generalized to codes with N codewords, given by:

$$\Phi_n[k] = k \times (n-1) \times 360°/N. \tag{7}$$

For this class of code, each power control command n is characterized by a codeword with a constant phase rotation rate $\Delta_R$ equal to $(n-1) \times 360°/N$, where N is the desired total number of possible power control commands that can be transmitted. Thus, for the exemplary set of codewords provided in Table II, the phase rotation rate $\Delta_R$ for power control command 2 is 45°, while the phase rotation rate $\Delta_R$ for power control command 4 is 135°.

Using a set of codewords defined by a corresponding set of phase rotation rates creates codewords that are easily distinguished and which provide resistance to phase errors incurred during the receive processing of any single Walsh symbol.

An alternative code which could be used to transmit 8-ary power control commands over the phase-encoded subchannel is listed in Table III:

TABLE III

Alternative 8-ary Phase Code.

| Power Control Command (n) | Phase Symbol $\Phi_n[1]$ | Phase Symbol $\Phi_n[2]$ | Phase Symbol $\Phi_n[3]$ | Phase Symbol $\Phi_n[4]$ | Phase Symbol $\Phi_n[5]$ | Phase Symbol $\Phi_n[6]$ |
| --- | --- | --- | --- | --- | --- | --- |
| 1 | 0° | 0° | 0° | 0° | 0° | 0° |
| 2 | 0° | 0° | 0° | 180° | 0° | 180° |
| 3 | 0° | 0° | 180° | 0° | 180° | 0° |
| 4 | 0° | 0° | 180° | 180° | 180° | 180° |
| 5 | 0° | 180° | 0° | 0° | 180° | 180° |
| 6 | 0° | 180° | 0° | 180° | 180°° | 0° |
| 7 | 0° | 180° | 180° | 0° | 0° | 180° |
| 8 | 0° | 180° | 180° | 180° | 0° | 0° |

By using only 0° and 180° phase values, this alternative approach allows for less complex decoders and encoders to be used because the values of phase changes can be characterized as plus or minus one, reducing the complexity of the multiplication operation performed by complex multiply 306. At the transmit system using only 0° and 180° phase values allows phase encoding such as that performed by phase encoder 82 to be performed simply by inverting the sign of those Walsh symbols which require a 180° phase shift, either before or after modulation with the long code and spreading codes.

By transmitting power control commands via phase rotation of the user data already being transmitted, the above described invention allows forward link power control to be conducted without reducing or interfering with the transmission of user data via the reverse link transmission from a subscriber unit 10. Also, by allowing a power control command to be transmitted completely within a power control group, the transmit power can be adjusted up to once every 1.25 ms. Such rapid power control is useful for minimizing data loss due to fading conditions because the transmit power can be increased quickly before substantial amounts of data have been lost.

Additionally, because the reverse link is typically processed in non-coherent fashion, the above described invention allows the power control command to be transmitted while remaining compatible with base stations 12 configured to process signals in accordance with the IS-95 standard. In other words, preexisting base stations 12 will still be able to properly process the user data from signals transmitted in accordance with the present invention, although these base stations 12 will be unable to receive the power control commands sent over the phase-encoded subchannel.

In an alternative embodiment of the invention, phase rotations between individual Walsh symbols are used to transmit power control commands. That is, the difference in the phase of two successive Walsh symbols, or two sets of Walsh symbols, is used to indicate whether the transmit power of the forward link channel should be increased or decreased. This alternative embodiment of the invention allows multiple power control commands to be transmitted during each power control group, and therefore increases the rate at which the transmit power can be adjusted.

Because the energy associated with a portion of a power control group is very low, however, the error rate at which the power control commands are transmitted in this alternative embodiment of the invention is higher. Thus, this alternative embodiment is useful where an even faster response to fading conditions is required, and where more frequent errors in the transmission of power control commands are tolerable.

The invention can also be used within RF links employing continuous transmission of the reverse link signal, rather than the gated transmission of IS-95. In such continues transmission systems, the number of phase shifts employed in a codeword can vary greatly, including code words substantially larger than six Walsh symbols. Examples of systems employing a continuous transmission reverse link signal (or up-link) includes various satellite based wireless communication systems.

Thus, a novel and improved method and apparatus for establishing a subchannel within a CDMA signal has been described. One skilled in the art will recognize various alternative methods and apparatus for implementing the invention. The particular embodiment described above is provided for illustrative purposes, and should not be construed as limiting the scope of the invention.

We claim:

1. A method for transmitting a power control command over a reverse link signal processed in accordance with code division multiple access techniques comprising the steps of:

a) phase encoding the reverse link signal with a first sequence of phase rotations if the power control command is a first command; and b) phase encoding the reverse link signal with a second sequence of phase rotations if the power control command is a second command.

2. The method as set forth in claim 1 wherein steps a) and b) are performed over a power control group.

3. The method as set forth in claim 1 wherein said first sequence of phase rotations is defined by a first phase rotation rate and said second sequence of phase rotations is defined by a second phase rotation rate.

4. The method as set forth in claim 1 further comprising the steps of:

c) phase encoding the reverse link signal with a third sequence of phase rotation if the power control command is a third command; and d) phase encoding the reverse link signal with a fourth sequence of phase rotations if the power control command is a fourth command.

5. The method as set forth in claim 2 wherein step a) is performed via the steps of:

setting a first Walsh symbol in said power control group to a first phase;

setting a second Walsh symbol in said power control group to said first phase plus a phase delta;

setting a third Walsh symbol in said power control group to said first phase plus two times said phase delta;

setting a fourth Walsh symbol in said power control group to said first phase plus three times said phase delta;

setting a fifth Walsh symbol in said power control group to said first phase plus four times said phase delta; and setting a sixth Walsh symbol in said power control group to said first phase plus five times said phase delta.

6. A subscriber unit for transmitting a power control command via a reverse link signal comprising:

channel modulator for generating modulated user data; and phase encoder for generating phase rotated data by phase rotating said modulated user data using a power control codeword selected from a set of power control codewords; and transmitter for upconverting said phase rotated data.

7. The subscriber unit of claim 6 further comprising:

digital receive processor for generating a power control command in response to forward link signal; and power control encoder for generating said power control codeword in response to said power control command.

8. The subscriber unit as set forth in claim 6 wherein said phase encoder rotates each of a set of Walsh symbols in a power control group by a multiple of a phase rotation rate.

9. A receive processing system for receiving a power control command via a reverse link signal comprising:

first phase correlator for generating a first codeword correlation value by correlating reverse link signal data with a sequence of phases associated with a first codeword;

second phase correlator for generating a second codeword correlation value by correlating said reverse link signal data with a sequence of phases associated with a second codeword; and phase codeword selector for selecting a selected codeword from said first codeword correlation value and said second codeword correlation value.

10. The receive processing system as set forth in claim 9 wherein said first codeword correlation value and said second codeword correlation value are calculated over a power control group.

11. The receive processing system of claim 10 further comprising:

demodulator for generating demodulation data by demodulating the reverse link signal;

Walsh correlator for generating Walsh symbol correlation vectors using said demodulation data;

hard decision for generating a hard index based on said Walsh symbol correlation vectors; and selector for generating said reverse link signal data by selecting Walsh correlation values from said Walsh symbol correlation vectors using said hard index.

12. The receive processing system of claim 9 further comprising a codeword correlation value combiner for generating a codeword correlation vector by combining said first codeword correlation value with other first codeword correlation values and said second codeword correlation value with other second codeword correlation values.

13. A method for transmitting a subchannel data over a reverse link signal processed in accordance with code division multiple access techniques comprising the steps of:

a) modulating user data with a pseudorandom noise code;

b) phase adjusting a portion of said user data with a first phase code vector when said subchannel data is a first data set;

c) phase adjusting said portion of said user data with a second phase code vector when said subchannel data is a second data set; and d) transmitting said user data over the reverse link signal.

14. The method as set forth in claim 13 wherein said portion of said user data is comprised of a power control group.

15. The method as set forth in claim 14 wherein said first phase code vector and said second phase code vector are comprised of six phases.

16. The method of claim 13 wherein said user data is comprised of M-ary modulated code symbols.

* * * * *